United States Patent
Alapuranen

(10) Patent No.: US 8,014,415 B2
(45) Date of Patent: Sep. 6, 2011

(54) APPARATUS, SYSTEM AND METHOD FOR COMMUNICATING INFORMATION IN A WIRELESS COMMUNICATION NETWORK

(75) Inventor: Pertti O. Alapuranen, Deltona, FL (US)

(73) Assignee: MeshNetworks, Inc., Maitland, FL (US)

( * ) Notice: Subject to any disclaimer, the term of this patent is extended or adjusted under 35 U.S.C. 154(b) by 737 days.

(21) Appl. No.: 11/324,097

(22) Filed: Dec. 30, 2005

(65) Prior Publication Data

US 2007/0153729 A1 Jul. 5, 2007

(51) Int. Cl.
*H04L 12/28* (2006.01)
*H04W 4/00* (2009.01)
*H04L 27/28* (2006.01)
*H04J 1/00* (2006.01)

(52) U.S. Cl. ......... 370/431; 370/329; 370/480; 375/260
(58) Field of Classification Search .................. None
See application file for complete search history.

(56) References Cited

U.S. PATENT DOCUMENTS

| 5,151,899 | A | 9/1992 | Thomas et al. |
| 5,790,587 | A | 8/1998 | Smith et al. |
| 6,978,149 | B1 * | 12/2005 | Morelli et al. ................. 455/522 |
| 2005/0174966 | A1 * | 8/2005 | Lansford et al. ............... 370/329 |
| 2006/0008085 | A1 * | 1/2006 | Matsuo ............................ 380/34 |

OTHER PUBLICATIONS

PCT/US06/62140, PCT Search Report and Written Opinion, mailed Oct. 16, 2007, 10 pages.
PCT/US2006/062140, PCT Preliminary Report on Patentability, mailed Jul. 10, 2008, 7 pages.

* cited by examiner

*Primary Examiner* — Ricky Ngo
*Assistant Examiner* — Clemence Han
(74) *Attorney, Agent, or Firm* — Randi L. Karpinia

(57) ABSTRACT

Techniques are provided for communicating a data stream in a wireless communication network. A source divides the data stream into a first data sub-stream and a second data sub-stream. The first data sub-stream can be modulated using a first modulation technique to generate a first modulated data sub-stream, and the second data sub-stream can be modulated using a second modulation technique to generate a second modulated data sub-stream. A destination receives the first data sub-stream over a first frequency band, and receives the second data sub-stream over a second frequency band. The destination demodulates the first data sub-stream using a first demodulation technique to generate a first demodulated data sub-stream, and demodulates the second data sub-stream using a second demodulation technique to generate a second demodulated data sub-stream. The destination then combines the first demodulated data sub-stream and the second demodulated data sub-stream to generate the data stream.

12 Claims, 9 Drawing Sheets

APPARATUS, SYSTEM AND METHOD FOR COMMUNICATING INFORMATION IN A WIRELESS COMMUNICATION NETWORK

FIELD OF THE INVENTION

The present invention relates generally to wireless communications and more particularly to techniques for transmitting information between two or more communication devices within a wireless communication network.

BACKGROUND

A multi-band communication device traditionally refers to a communication device operable in at least two different frequency bands. The device typically uses multiple independently-operating radio modules to communicate in each of these different frequency bands. Each radio module operates independently and includes its own independent radio frequency (RF) processor and baseband processor. For instance, multi-mode handsets, such as a Code Division Multiple Access-Time Division Multiple Access-Global System for Mobile communication (CDMA-TDMA-GSM) handset, may have partial or complete implementations of all three radio modules and corresponding implementations of three RF stages. In such handsets only one of the radio modules is operated at any given time for communicating user information (e.g., a packet burst or stream of control/signaling information and/or user data).

A hand-off procedure (sometimes also referred to as a hand-over procedure) can be performed to switch from one radio module to another radio module. During a hand-off, the transmission of user information can be switched from one radio module operating over a first communication link to the other radio module operating over a second communication link.

Notwithstanding these advances, it would be desirable to provide improved techniques for utilizing the capacity of the different radio modules in such multi-mode devices.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
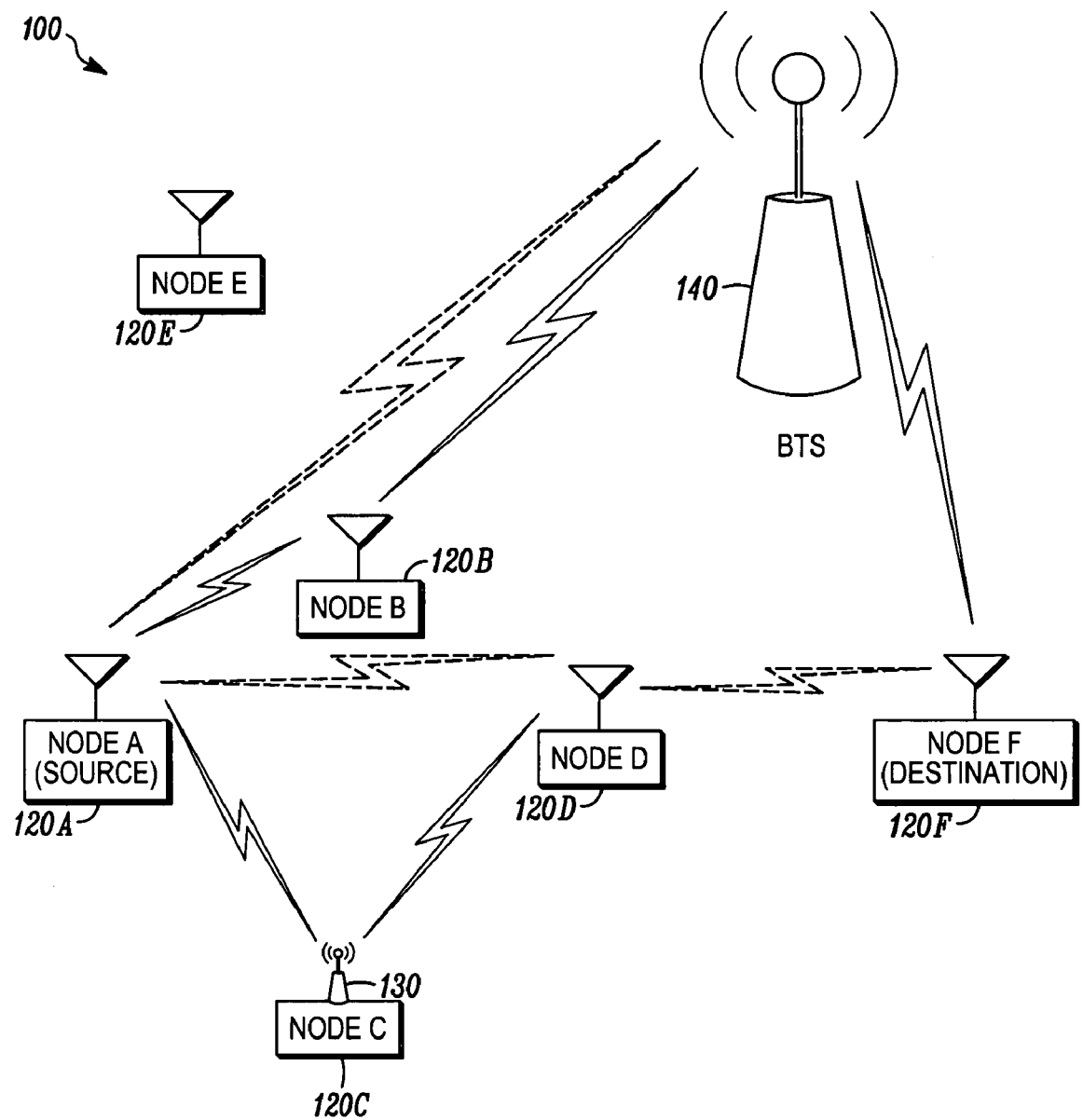
FIG. 1 is a block diagram of an exemplary communication network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to communicating information in a wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions described herein for communicating information in a wireless communication network. The non-processor circuits may include, but are not limited to, a radio receiver, a radio transmitter, signal drivers, clock circuits, power source circuits, and user input devices. As such, these functions may be interpreted as steps of a method for communicating information in a wireless communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments described below relate to an apparatus, system and method for communicating information (e.g., a data stream) in a wireless communication network comprising a first node and a second node.

The first node can divide the data stream into a first data sub-stream and a second data sub-stream. The first node comprises a first radio module having a first data rate and a second radio module having a second data rate. The first radio module can operate in a first frequency band having a first bandwidth and the second radio module can operate in a second frequency band having a second bandwidth. The first radio module can modulate the first data sub-stream using a first modulation technique to generate a first modulated data sub-stream. The second radio module can simultaneously modulate the second data sub-stream using a second modulation technique to generate a second modulated data sub-stream. The first and second modulated data sub-streams are then transmitted.

The second node can receive the first data sub-stream over the first frequency band and the second data sub-stream over the second frequency band. The second node also comprises a first radio module and a second radio module. The first radio module of the second node can demodulate the first data sub-stream using a first demodulation technique to generate a first demodulated data sub-stream, and the second radio module of the second node can demodulate the second data sub-stream using a second demodulation technique to generate a second demodulated data sub-stream. The second node is configured to combine the first demodulated data sub-stream and the second demodulated data sub-stream to generate the data stream transmitted from the first node.

Exemplary Communication Network

FIG. 1 is a block diagram of an exemplary communication network 100 which comprises a number of nodes 120 A-F including a source node 120A and a destination node 120F, a wireless access point 130 coupled to a first wired network (not shown), and a wireless base transceiver station (BTS) 140 coupled to another wired network (not shown). It will be appreciated that any of the nodes shown in FIG. 1 could be a destination node or a source node, and that FIG. 1 shows an example in which node 120A is the source node and node 120F is the destination node.

Types of wireless networks include infrastructure-based wireless networks and ad hoc wireless networks. An infrastructure-based wireless network typically includes a communication network with fixed and wired gateways. Wireless communication systems are widely deployed to provide various types of communication such as voice and data. A typical wireless network provides multiple users access to one or more shared resources. A system may use a variety of multiple access techniques such as Frequency Division Multiplexing (FDM), Time Division Multiplexing (TDM), Code Division Multiplexing (CDM), and others. Example wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard).

Many infrastructure-based wireless networks employ a mobile unit or node which communicates with a fixed base station that is coupled to a wired network. The mobile unit can move geographically while it is communicating over a wireless link to the base station. When the mobile unit moves out of range of one base station, it may connect or "handover" to a new base station and start communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile "nodes." Examples of ad hoc networks include Wireless Local Area Networks (WLANs) such as described in the IEEE 802.11 standards (e.g. 802.11 (a), (b), or (g)). Improvements over these networks may be achieved in deploying a Multiple Input Multiple Output (MIMO) WLAN comprising Orthogonal Frequency Division Multiplexing (OFDM) modulation techniques.

An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network.

The nodes 120A-120F typically support simultaneous operation in both infrastructureless mode and infrastructured mode and can move seamlessly between infrastructure-based networks (those including for example AP 130 or BTS 140) and client-based peer-to-peer networks which are free of any infrastructure. For example, the source node 120A can operate in an ad hoc mode in which an ad hoc communication network can be created between a plurality of nodes 120A-120F each having wireless repeater and routing capability, and optionally wired Access Points (APs) 130. The source node 120A can communicate directly with other nodes 120 B-F which are located one "hop" away from the source node 120 (e.g., communications to or from nodes 120A-120F can "hop" through each other to reach other nodes 120A-120F in the ad hoc network).

The nodes 120A-120F can generally be wireless devices capable of receiving packetized audio, video and/or data information. Some of the components in an exemplary node, such as an appropriate processor, transmitter, receiver and antenna, are described below with reference to FIGS. 2-9. The nodes 120A-120F can communicate information packets over wireless carrier frequencies, each of which includes one or more wireless communication channels.

The source node 120A can operate in an infrastructured mode (e.g., cellular or WLAN mode) in which it communicates with a wired network either through the AP 130 or the BTS 140. In an infrastructured mode, the AP 130 and BTS 140 are typically coupled to a wired network (not shown) that can provide one or more sources of audio, video and/or data information. The APs 130 may be, for example, a wireless access point that complies with the IEEE 802.11 Standard or other wireless local area network (WLAN) Standards, a Bluetooth access point, or the like. The nodes (e.g., node 120C) in close proximity to the AP 130 can receive transmissions from other nodes utilizing an ad hoc air interface and relay these transmissions to infrastructure equipment via an uplink communication signal utilizing, for example, a Bluetooth or a WLAN air interface. Similarly, nodes in close proximity to the AP 130 can receive downlink communications over the Bluetooth or WLAN air interface and transmit uplink communications to another node via the ad hoc air interface.

The BTS 140 may be a cellular base station or the like. The nodes 120A-120F can communicate information packets with a cellular-based network (not shown) over wireless carrier frequencies, each of which includes one or more wireless communication channels depending on the multiple access scheme utilized in the cellular-based network. Examples of multiple access schemes which can be used in the network can include any one or more of time division multiple access (TDMA), direct sequence or frequency hopping code division multiple access (CDMA), frequency division multiple access (FDMA), orthogonal frequency division multiplexing (OFDM), opportunity division multiple access (ODMA), a combination of any of the foregoing multiple access technologies, a multiple access technology in which portions of the frequency spectrum to be used are determined by local signal quality measurements and in which multiple portions of the frequency spectrum may be used simultaneously, or any other multiple access or multiplexing methodology or combination thereof.

The nodes in communication proximity to the BTS 140 can receive transmissions from other nodes utilizing the ad hoc air interface and relay these transmissions to the BTS 140 via uplink communication signals utilizing, for example, a cellular air interface. Similarly, nodes in communication proximity to the BTS 140 can receive downlink communications over the cellular air interface and transmit uplink communications to another node via the ad hoc air interface.

Each node 120A-120F can advertise its presence to other nodes by periodically broadcasting an advertisement message. In response to the advertisement message, other nodes within range can acknowledge their presence by identifying themselves. In turn, each node can identify its neighbor nodes, and maintain a neighbor list of nodes in proximity to that node. As used herein, a "neighbor node" is a node which is one hop away from the node such that the nodes may communicate with each other. A particular node's neighbor list changes dynamically as the topology of the network changes. At the particular instant in time shown in FIG. 2, node 120A has three neighbor nodes—node 120B, node 120C, and node 120D.

In the exemplary network topology shown in FIG. 1, source node 120 A can potentially transmit information to destination node 120F over a number of different communication paths utilizing different modes of operation. For example, the source node 120A can operate in an ad hoc mode to transmit information over a communication path which is provided by node 120C or AP 130 and then to node 120D and then to the destination node 120F. Alternatively, the source node 120A can operate in an ad hoc mode to transmit information over a communication path which is provided by node 120B to node 120D to the destination node 120F. In addition, if the source node 120 A is within communication range of the BTS 140, the source node 120A can also operate in a cellular mode to transmit information directly to BTS 140 and then from BTS 140 to the destination node 120F. In addition, the source node 120A can also operate in a hybrid ad hoc/cellular mode to transmit information over a communication path which is provided by node 120B (or node 120D) to BTS 140 and then from BTS 140 to the destination node 120F.

Techniques will now be described with reference to FIGS. 2 and 3 for communicating information (e.g., a data stream) in a wireless communication networks, such as, the network 100. According to these techniques, a source divides the data stream into a first data sub-stream and a second data sub-stream. The first data sub-stream can be modulated using a first modulation technique to generate a first modulated data sub-stream, and the second data sub-stream can be modulated using a second modulation technique to generate a second modulated data sub-stream. A destination receives the first data sub-stream over a first frequency band, and receives the second data sub-stream over a second frequency band. The destination demodulates the first data sub-stream using a first demodulation technique to generate a first demodulated data sub-stream, and demodulates the second data sub-stream using a second demodulation technique to generate a second demodulated data sub-stream. The destination then combines the first demodulated data sub-stream and the second demodulated data sub-stream to generate the data stream (or information) which the source sought to transmit.

Exemplary Source or Transmitting Node

Figure 2:
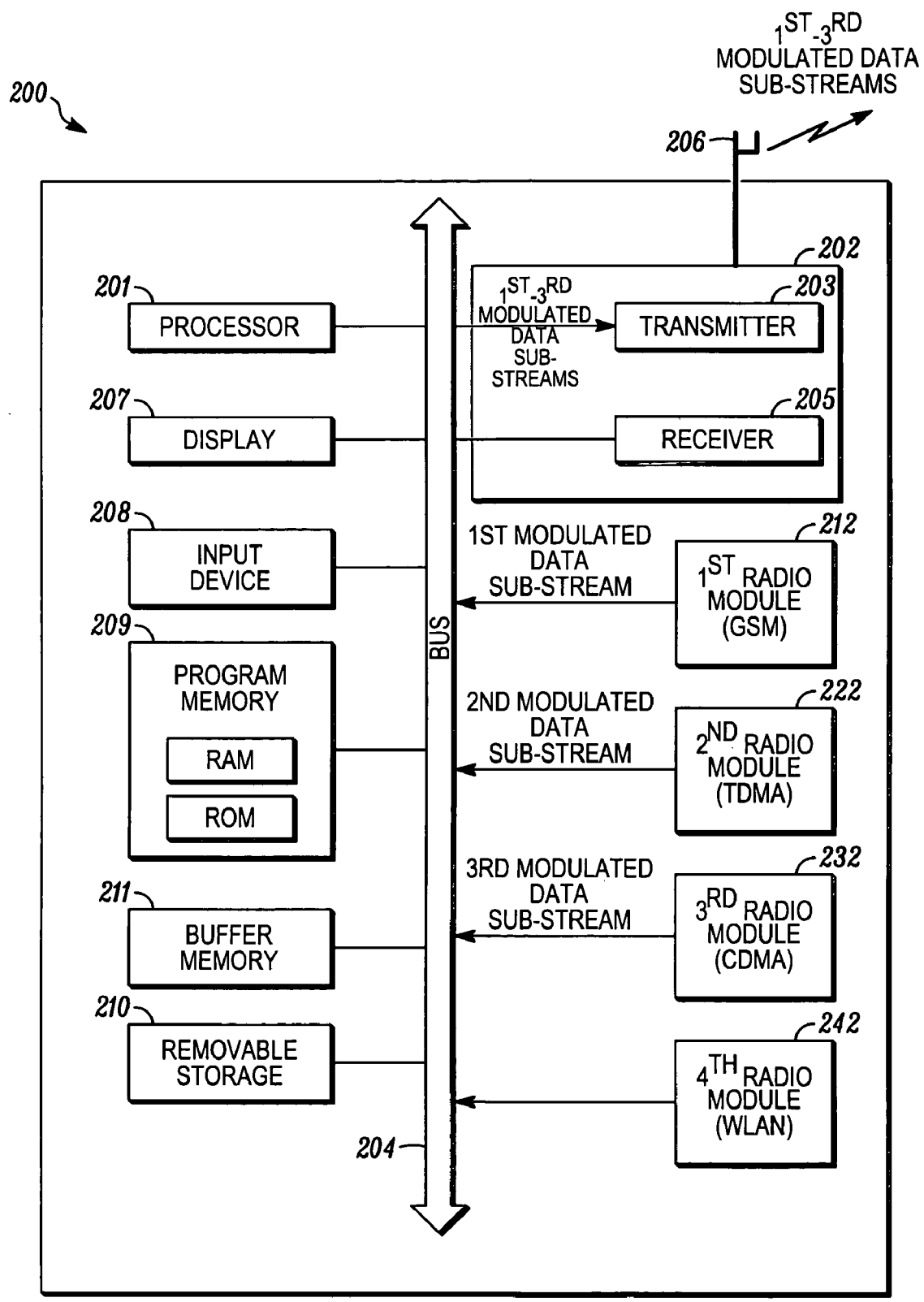
FIG. 2 is a block diagram of an exemplary source node for transmitting information in accordance with some embodiments of the invention.

FIG. 2 is a block diagram of an exemplary source or transmitting node 200 in accordance with some embodiments of the invention. The node 200 comprises a processor 201, a transceiver 202 including a transmitter circuitry 203 and a receiver circuitry 205, an antenna 206, a display 207, an input device 208, a program memory 209 for storing operating instructions that are executed by the processor 201, a removable storage unit 210, a buffer memory 211, a first radio module 212, a second radio module 222, a third radio module 232 and a fourth radio module 242.

Although not shown, the node 200 also preferably includes an antenna switch, duplexer, circulator, or other highly isolative means (not shown) for intermittently providing information packets from the transmitter circuitry 203 to the antenna 206 and from the antenna 206 to the receiver circuitry 205. The node 200 is preferably an integrated unit containing at least all the elements depicted in FIG. 2, as well as any other elements necessary for the node 200 to perform its particular functions. Alternatively, the node 200 may comprise a collection of appropriately interconnected units or devices, wherein such units or devices perform functions that are equivalent to the functions performed by the elements of the node 200. For example, the node 200 may be implemented as a computer with a wireless local area network (WLAN) card.

The processor 201 can include one or more microprocessors, microcontrollers, DSPs (digital signal processors), state machines, logic circuitry, or any other device or devices that process information based on operational or programming instructions. Such operational or programming instructions are preferably stored in the program memory 209. The program memory 209 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, the memory 209 containing the corresponding operational instructions may be embedded within the state machine or logic circuitry. The operations performed by the processor 201 and the rest of the node 200 are described in detail below.

The transmitter circuitry 203 and the receiver circuitry 205 enable the node 200 to communicate information packets to and acquire information packets from the other nodes within the communication network. In this regard, the transmitter circuitry 203 and the receiver circuitry 205 include circuitry to enable digital or analog transmissions over a wireless communication channel. The transmitter circuitry 203 and the receiver circuitry 205 are designed to operate over a cellular air interface (e.g., Global System for Mobile communication (GSM), Code Division Multiple Access (CDMA), Wideband CDMA (WCDMA), Universal Mobile Telecommunications System (UMTS), and the like), an ad hoc networking air interface (e.g., BLUETOOTH, 802.21 WLAN, 802.16 WiMax, and the like) and other radio air interfaces such as those used in Motorola Inc.'s Mesh Enabled Architecture (MEA) type radios.

The implementations of the transmitter circuitry 203 and the receiver circuitry 205 depend on the implementation of the node 200. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the node 200 or insertable into the node 200 (e.g., embodied in a wireless a radio frequency (RF) modem implemented on a Personal Computer Memory Card International Association (PCMCIA) card). For a wireless communication device, the transmitter circuitry 203 and the receiver circuitry 205 are preferably implemented as part of the wireless device hardware and software architecture in accordance with known techniques. Most, if not all, of the functions of the transmitter circuitry 203 and/or the receiver circuitry 205, as well as the first radio module 212, the second radio module 222, the third radio module 232 and the fourth radio module 242 can be implemented in a processor, such as the processor 201. However, the processor 201, the transmitter circuitry 203, the receiver circuitry 205, the first radio module 212, the second radio module 222, the third radio module 232 and the fourth radio module 242 have been artificially partitioned herein to facilitate a better understanding.

The receiver circuitry 205 is capable of receiving RF signals from at least one frequency bandwidth and optionally more than one frequency bandwidth, if the communications with the proximate device are in a frequency band other than that of the network communications. The receiver circuitry 205 can optionally comprise a first receiver for receiving signals over a first frequency bandwidth, a second receiver for receiving signals over a second frequency bandwidth, a third receiver for receiving signals over a third frequency bandwidth, a fourth receiver for receiving signals over a fourth frequency bandwidth, etc., or one receiver capable of receiving signals over multiple different frequency bandwidths. The receiver 205, depending on the mode of operation, can be tuned to receive, for example, Public Land Mobile Radio System (PLMRS), Advanced Mobile Phone Service (AMPS), GSM, CDMA, UMTS, WCDMA, Bluetooth, or WLAN (e.g., IEEE 802.11) and other types of communication signals. The transceiver 202 includes at least one set of transmitter circuitry 203. The at least one transmitter 203 may be capable of transmitting to multiple devices over multiple frequency bands. As with the receiver 205, multiple transmitters 203 may optionally be employed. In one implementation, one transmitter can be used for the transmission to a proximate node or direct link establishment to WLAN's and other transmitters can be used for transmission to a cellular base station(s).

The antenna 206 comprises any known or developed structure for radiating and receiving electromagnetic energy in the frequency range containing the wireless communication frequencies.

The buffer memory 211 can be any form of volatile memory, such as RAM, and is used for temporarily storing received information packets.

When the node 200 is constructed to receive video information from a video source, the node 200 preferably further includes a video decoder capable of decoding the current Moving Picture Experts Group (MPEG) standard or some other video decoding standard. When the node 200 is further capable of transmitting video information, the node 200 preferably further includes a video encoder capable of encoding the video data into at least one of the foregoing video standards. Such video encoder and decoder is preferably implemented as part of the processor 201.

The radio modules 212, 222, 232, 242 can each operate over a different radio protocol in a different frequency bandwidth. In the exemplary node 200, the first radio module 212 is shown as a GSM radio module, the second radio module 222 is shown as a TDMA radio module, the third radio module 232 is shown as a CDMA (or wideband CDMA (WCDMA) radio module and the fourth radio module 242 is shown as a WLAN radio module such as one which complies with IEEE 802.11 standards. However, it should be appreciated that these radio modules 212, 222, 232, 242 could be other types of radio modules such as ultra wide band (UWB) radio modules, IEEE 802.15.3 radio modules or MEA radio modules. In general, the radio modules 212, 222, 232, 242 can support communication in compliance with at least the following communication standards: (1) the "TIA/EIA-95-B Mobile Station-Base Station Compatibility Standard for Dual-Mode Wideband Spread Spectrum Cellular System" (referred to herein as the IS-95 standard), (2) the "TIA/EIA-98-D Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (referred to herein as the W-CDMA standard), (4) the standard offered by a consortium named "3rd Generation Partnership Project 2" (3GPP2) and embodied in a set of documents including Document Nos. C.S0002-A, C.S0005-A, C.S0010-A, C.S0011-A, C.S0024, and C.S0026 (referred to herein as the cdma2000 standard), and (5) other standards. These standards are incorporated herein by reference.

As such, the following description refers to a generic "first radio module," a generic "second radio module," and a generic "third radio module." Unless otherwise specified, the first through third radio modules could be implemented according to any radio communication standard.

Figure 3:
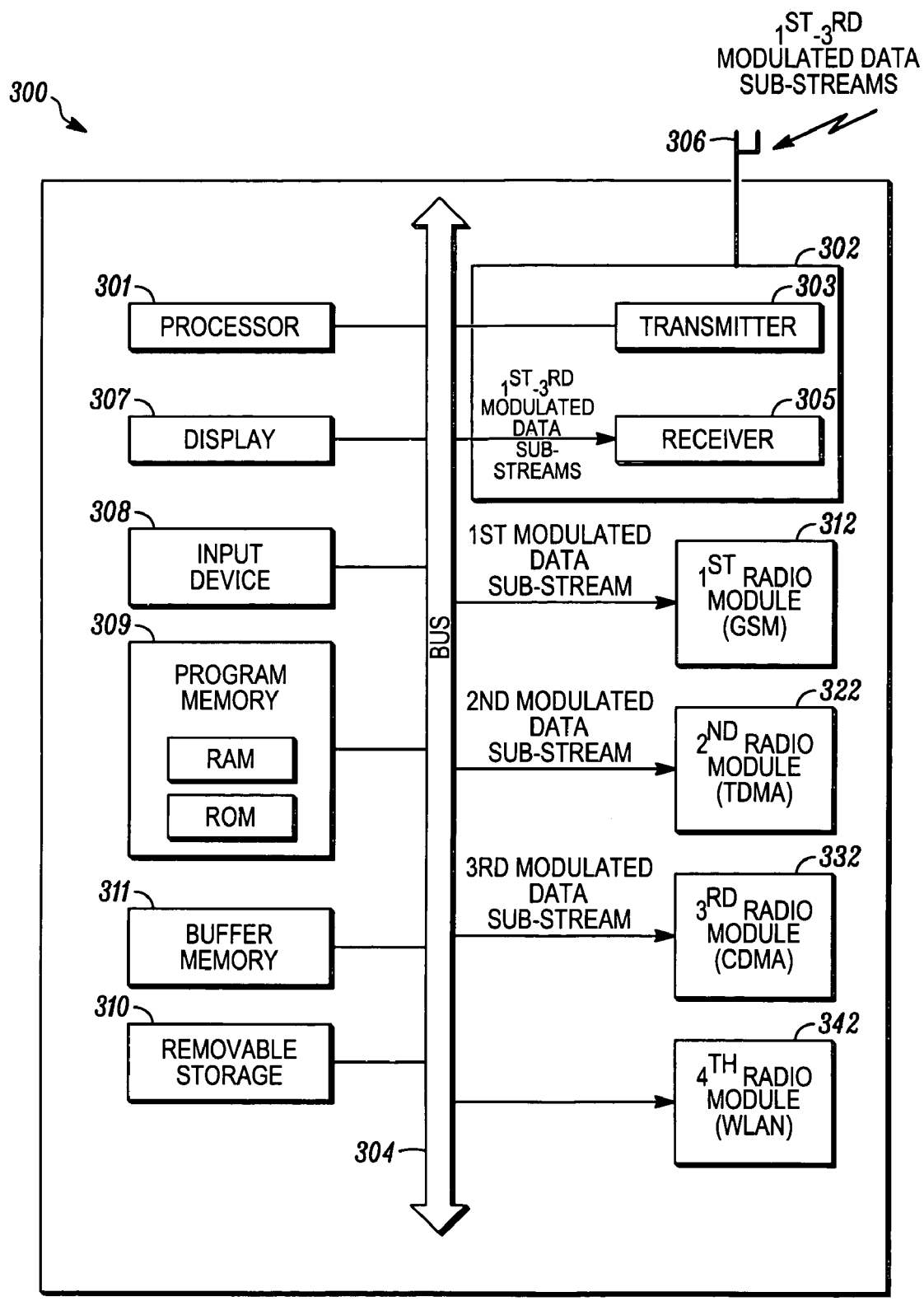
FIG. 3 is a block diagram of an exemplary destination node for receiving the information in accordance with some embodiments of the invention.

While the exemplary nodes 200, 300 in FIGS. 2 and 3 each show four radio modules 212/312, 222/322, 232/332, 242/342, it will be appreciated that in other practical implementations nodes could include only some of these radio modules or additional radio modules which are not shown. For example, a node could include other radio modules such as ultra wide band (UWB) radio modules which implement spread spectrum, OFDM or other modulation techniques. In addition, in the following example, the processor 201 decides to only use the radio modules 212, 222, 232 to modulate information that is to be transmitted, and does not use the capacity of the fourth radio module 242 to modulate the information that is to be transmitted. Nevertheless, in other situations, the processor 201 could utilize, for example, fewer radio modules (e.g., radio modules 212, 222) to modulate information that is to be transmitted, more radio modules (e.g., radio modules 212, 222, 232, 242) to modulate information that is to be transmitted, or additional radio modules which are not shown in FIGS. 2 and 3.

The processor 201 of the sending node 200 can divide or split a data stream to be transmitted into multiple sub-streams. For instance, in the example of FIG. 2, the processor 201 can divide the data stream into a first data sub-stream having a first size, a second data sub-stream having a second size and a third data sub-stream having a third size. The processor 201 adds a unique packet identification (ID) or number to each packet before splitting the data streams so that the packet streams can be combined and efficiently processed at a destination node.

In one embodiment, data can be divided between different radio modules 212, 222, 232 in a ratio of their communication capacities. Thus, when the device 200 wants to transmit, the device 200 can effectively use the combined bandwidths of multiple bands together to create the equivalent of a larger bandwidth communications link for data transmission. For example, in one implementation, the processor 201 can determine the first size of the first data sub-stream, the second size of the second data sub-stream and the third size of the third data sub-stream based on a ratio of the first bandwidth, the second bandwidth, and the third bandwidth. For example, if three radio modules 212, 222, 232 support relative bandwidths 1, 2, 3 with respect to each other, then the total bandwidth is 6, and the first size would be $\frac{1}{6}^{th}$ of the total data stream, the second size would be $\frac{1}{3}^{rd}$ of the total data stream, and the third size would be $\frac{1}{2}$ of the total data stream. For instance, if the total data stream to be communicated is a 6 Megabit per second stream, first radio transfers 1 Megabits per second, second radio 2 Megabits per second and third radio 3 Megabits per second.

By contrast, if only two radio modules are used to transmit the data stream, the ratio of the first size to the second size can be the same as the ratio of the first bandwidth and the second bandwidth. In other words, the processor 201 can split the data stream into the first data sub-stream having the first size ($\frac{1}{3}$ of the total data stream) and the second data sub-stream having the second size ($\frac{2}{3}$ of the total data stream) based on the ratio of the first bandwidth (1) to the total bandwidth (3), and the second bandwidth (2) to the total bandwidth (3).

In FIG. 2, the first radio module 212 operates at first data rate (or one of a first set of data rates), and is operable in a first frequency band (or one of a set of first frequency bands) having a first bandwidth. The first radio module 212 can modulate the first data sub-stream using a first modulation technique appropriate for the first frequency band to generate the first modulated data sub-stream. In this example, the first radio module 212 is a GSM radio module and can modulate the first data sub-stream using an appropriate GSM modulation technique for the data to be transmitted to produce a GSM modulated data sub-stream. It will be appreciated that GSM technologies provide a variety of different modulation techniques.

The second radio module 222 operates at a second data rate (or one of a second set of data rates), and is operable in a second frequency band (or one of a set of second frequency bands) having a second bandwidth. The second radio module 222 can modulate the second data sub-stream using a second modulation technique appropriate for the second frequency band to generate the second modulated data sub-stream. In this example, the second radio module 222 is a TDMA radio module and can modulate the second data sub-stream using an appropriate TDMA modulation technique for the data to be transmitted to produce a TDMA modulated data sub-stream. It will be appreciated that TDMA technologies provide a variety of different modulation techniques.

The third radio module 232 operates at a third data rate (or one of a third set of data rates), and is operable in a third frequency band (or one of a set of third frequency bands) having a third bandwidth. The third radio module 232 is configured to modulate the third data sub-stream using a third modulation technique appropriate for the third frequency band to generate the third modulated data sub-stream. In this example, the third radio module 212 is a CDMA radio module and can modulate the third data sub-stream using an appropriate CDMA modulation technique for the data to be transmitted to produce a CDMA modulated data sub-stream. It will be appreciated that CDMA technologies provide a variety of different modulation techniques.

In contrast to conventional multi-mode devices, the first radio module 212, the second radio module 222 and the third radio module 232 are configured to operate simultaneously to modulate the first, second and third data sub-stream, respectively, and to simultaneously provide the first, second and third data sub-streams to the transmitter 203 for simultaneous transmission to a particular destination.

The transmitter 203 can use the first bandwidth, the second bandwidth and the third bandwidth to simultaneously transmit the first modulated data sub-stream in the first frequency band, transmit the second modulated data sub-stream in the second frequency band, and transmit the third modulated data sub-stream in the third frequency band. The transmitter 203 can transmit the data stream at a combined data rate being substantially equal to the sum of the first data rate, the second data rate and the third data rate. For example, if the first data rate of the GSM radio module is 64 Kilobits per second (Kbps), the second data rate of the TDMA radio module is 30 Kbps, and the third data rate of the CDMA radio module is 150 Kbps, then the transmitter 203 can transmit the data stream at a combined data rate of 244 Kbps.

Exemplary Destination or Receiving Node

FIG. 3 is a block diagram of an exemplary destination node 300 for receiving information from the source node 200 in accordance with some embodiments of the invention. It will be appreciated that any of the nodes shown in FIG. 1 could be a destination node or a source node, and further that the exemplary source node 200 of FIG. 2 and the exemplary destination node 300 of FIG. 3 could be used in a number of other network configurations which are different from the particular network configuration shown in FIG. 1.

Although the reference numbers used in FIG. 3 differ from those used in FIG. 2, the destination node 300 includes substantially similar components as the source node 200. For sake of brevity those components will not be described here again.

As noted above, in this particular example, the processor 201 of source node 200 has decided to only use the radio modules 212, 222, 232 to modulate information that is to be transmitted to the destination node 300. As such, in this example, the fourth radio module 342 in the destination node 300 is not used to demodulate the information that is to be received from the source node 200. Nevertheless, in other situations, fewer radio modules (e.g., radio modules 312, 322) or more radio modules (e.g., radio modules 312, 322, 332, 342) could be used to receive information from a source node and to demodulate the information. It will be appreciated that the functionality described below with respect to the destination node 300 could also be implemented in the source node 200 (and vice-versa), however, the functionality is being described with respect to separate nodes 200, 300 to clearly illustrate the functions which would be performed by a source node and its corresponding destination node.

Antenna 306 simultaneously receives packet streams comprising the first modulated data sub-stream transmitted from source node 200 over the first frequency band, the second modulated data sub-stream transmitted from source node 200 over the second frequency band, and the third modulated data sub-stream transmitted from source node 200 over the third frequency band and provides the first modulated data sub-stream, the second modulated data sub-stream and the third modulated data sub-stream to the receiver 305. The receiver 305 distributes the first modulated data sub-stream to the first radio module 312, the second modulated data sub-stream to the second radio module 322 and the third modulated data sub-stream to the third radio module 332.

The first radio module 312 demodulates the first data sub-stream using a first demodulation technique appropriate for the first band to generate a first demodulated data sub-stream. The first demodulation technique can be associated with a particular network access protocol (e.g., 802.11, OFDM, CDMA, TDMA, FDMA), and in this example is a GSM demodulation technique.

The second radio module 322 simultaneously demodulates the second data sub-stream using a second demodulation technique appropriate for the second band to generate a second demodulated data sub-stream. The second demodulation technique can also be associated with a particular network access protocol (e.g., 802.11, OFDM, CDMA, TDMA, FDMA), and in this example is a TDMA demodulation technique.

The third radio module 332 simultaneously demodulates the third data sub-stream using a third demodulation technique appropriate for the third band to generate a third demodulated data sub-stream The third demodulation technique can be associated with a particular network access protocol (e.g., 802.11, OFDM, CDMA, TDMA, FDMA), and in this example is a CDMA demodulation technique.

The processor 301 then receives the first, second and third demodulated data sub-streams from the first, second and third radio modules 312, 322, 332, respectively. Each packet has unique packet ID or number so that the packet streams can be combined at the processor 301. The processor 301 combines the first, second, and third demodulated data sub-streams by examining packet sequence numbers (or order of arrival numbers), discarding any duplicate packets, and reassembling the packets into the data stream that was originally sent by the source node 200.

Packet numbering is useful due to variable delay, for example, in situations where a handoff is being done from one radio band to another since in this situation the same packet stream can be transmitted by multiple radios and the transmission delay encountered using different paths can vary. For example, if information (e.g., a packet) is being transmitted using radio module 212 and radio module 212 can not communicate any more (e.g., due to fading or some other reason), radio module 212 will not receive an acknowledgement (ACK) message indicating that the information was successfully transmitted to the destination node 300. Even though the source node 200 does not receive the ACK message, the destination node 300 may have actually received the information. In this situation, the information can be retransmitted using another radio module such as radio module 222 which retransmits the same information. As a result, the destination node 300 receives the same packet two times. If radio module 222 has less delay than radio module 212, then the destination node 300 may perceive that the later packets sent by radio module 222 as arriving earlier than packets sent by radio module 212. These techniques can allow for seamless handoffs from one band to another band, and can also allow for "diversity" operation where same data is sent using multiple radios operating in different frequency bands.

EXAMPLE 1

Figure 4:
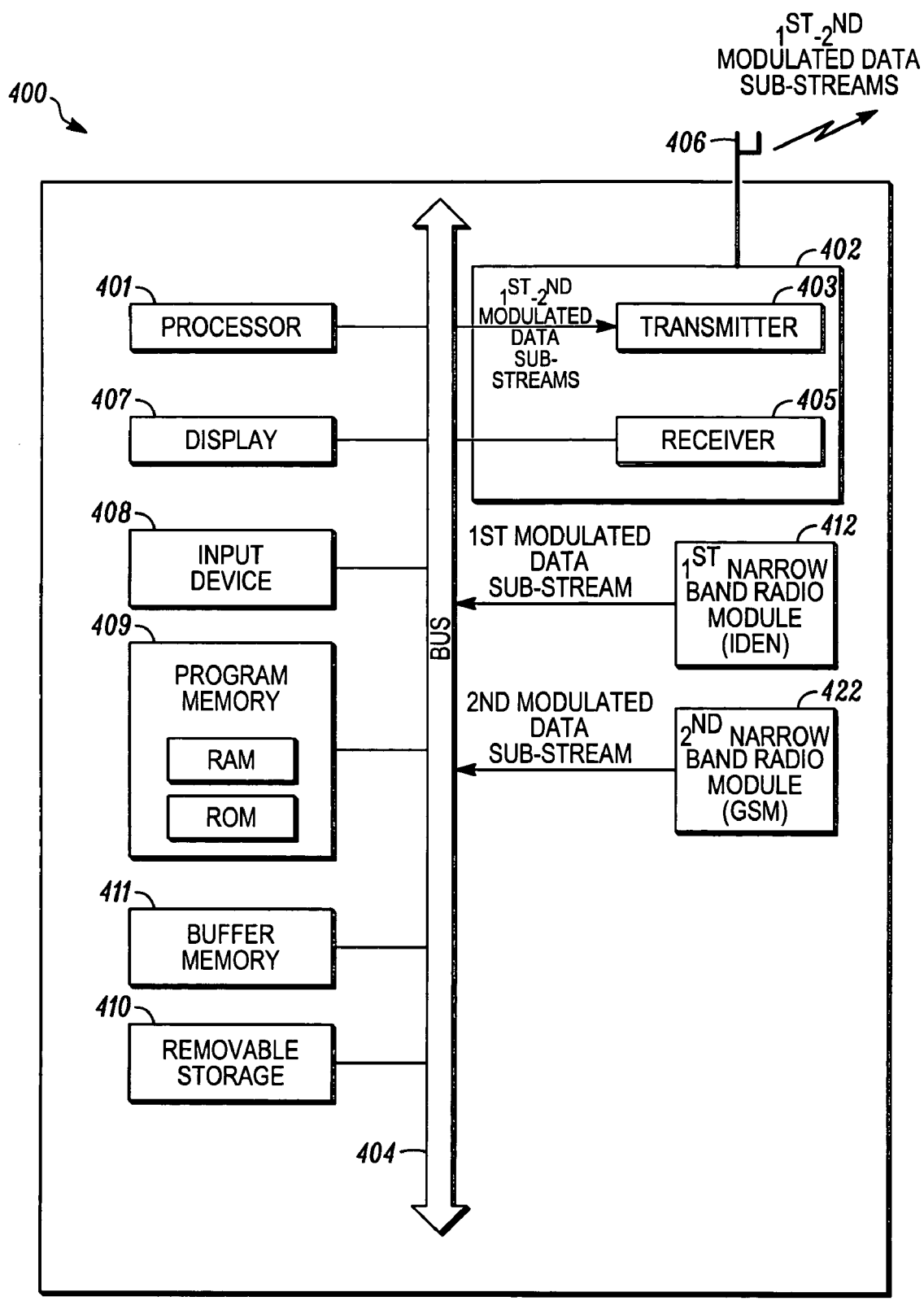
FIG. 4 is a block diagram of an exemplary source node for transmitting information in accordance with an exemplary implementation.
Figure 5:
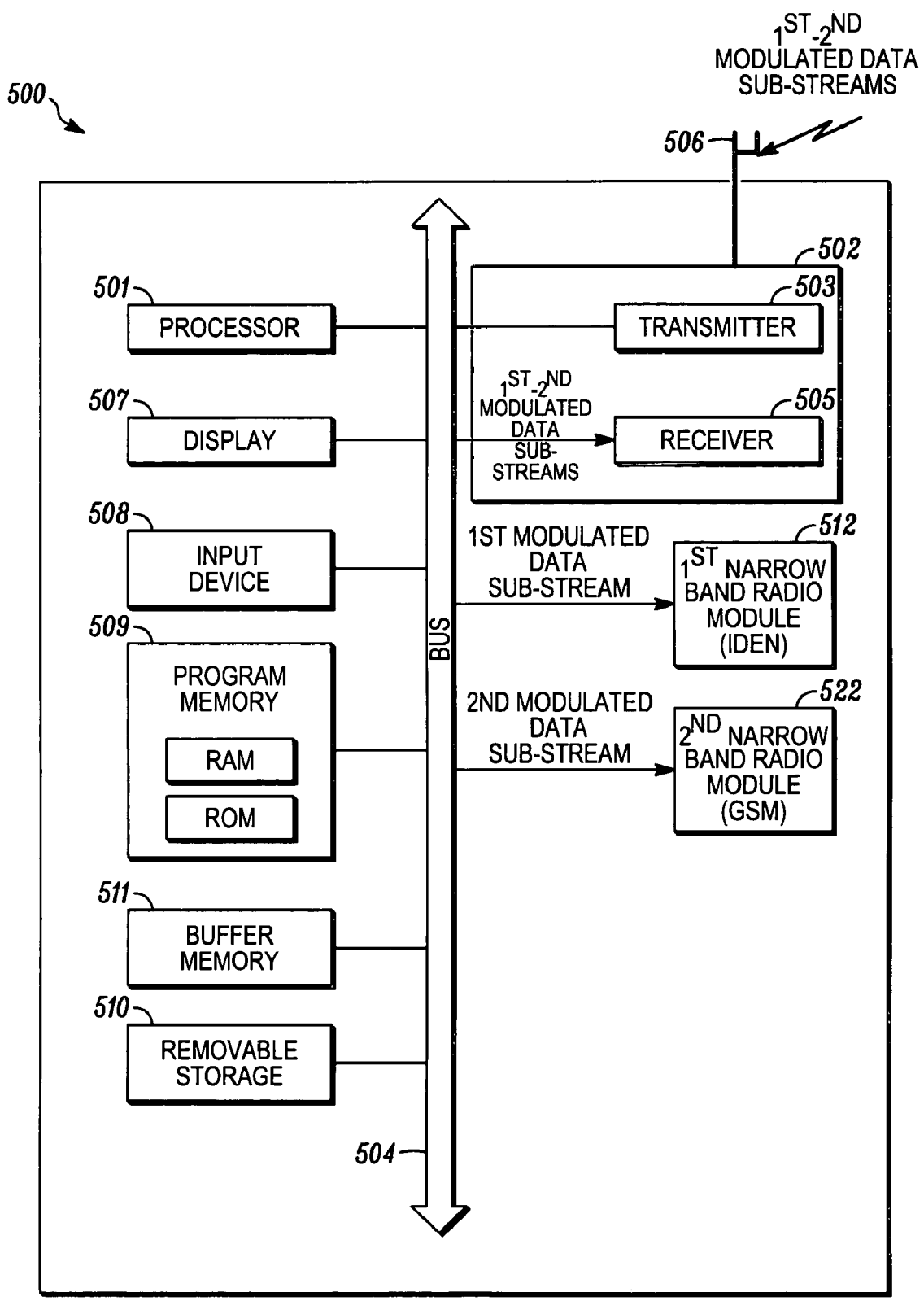
FIG. 5 is a block diagram of an exemplary destination node for receiving the information in accordance with an exemplary implementation.

FIG. 4 is a block diagram of an exemplary source node 400 for transmitting information, and FIG. 5 is a block diagram of an exemplary destination node 500 for receiving the information from source node 400 in accordance with an exemplary implementation of the invention. Although the reference numbers used in FIG. 4 differ from those used in FIG. 2, as shown in FIG. 4, the source node 400 includes many of the same components as the source node 200. Moreover, although the reference numbers used in FIG. 5 differ from those used in FIG. 3, the destination node 500 includes many of the same components as the destination node 300. For sake of brevity those components will not be described here again. As above, it will be appreciated that the source node 400 and destination node 500 can include other additional radio modules which are not shown.

In this implementation, two narrow band radio modules 412, 422 are provided. The narrow band radio modules 412, 422 can be utilized in addition to the radio modules shown in FIGS. 2 and 3. The narrow band radio modules 412, 422 could be implemented using, for example, an iDEN (Integrated Dispatch Enhanced Network) radio module, a GSM radio module, or a Personal Communication Services (PCS) radio module.

While the exemplary nodes 400, 500 in FIGS. 4 and 5 each show two narrow band radio modules 412/512, 422/522, it will be appreciated that in other practical implementations nodes could include only some of these radio modules or additional radio modules which are not shown. For example, a node could include other radio modules such as an IS-95 (CDMA) radio module, a wideband CDMA (WCDMA) radio module, cdma2000 radio module, an iDEN radio module or other radio modules. In addition, in the following example, the processor 401 decides to only use the radio modules 412, 422 to modulate information that is to be transmitted; however, in other situations, the processor 401 could utilize, for example, additional radio modules (not shown in FIGS. 4 and 5) to modulate information that is to be transmitted.

Narrow bands of spectrum associated with each of the narrow band radio modules 412, 422 can effectively be combined together by dividing a packet stream to be transmitted into multiple data sub-streams which are transmitted within these narrow bands.

The processor 401 of the sending node 400 can divide or split a data stream to be transmitted into multiple sub-streams. For instance, in the example of FIG. 4, the processor 401 can divide the data stream into a first data sub-stream having a first size and a second data sub-stream having a second size. Thus, the data sub-streams from each of the narrow band radio modules 412, 422 can be transmitted using different bands associated with each of the narrow band radio modules 412, 422. For example, in one implementation, two 5 MegaHertz (MHz) licensed bands can be combined into the equivalent of a single 10 MHz band.

The processor 401 adds a unique packet ID or number to each packet before splitting the data streams so that the packet streams can be combined and efficiently processed at a destination node.

In one embodiment data can be divided between different radio modules 412, 422 in a ratio of their communication capacities, as described above with reference to FIGS. 2 and 3. Thus, when the device 400 wants to transmit, the device 400 can effectively use the combined bandwidths of multiple bands together to create the equivalent of a larger bandwidth communications link for data transmission.

In FIG. 4, the first narrow band radio module 412 operates at first data rate (or one of a first set of data rates), and is operable in a first frequency band (or one of a set of first frequency bands) having a first bandwidth. The first narrow band radio module 412 can modulate the first data sub-stream using a first modulation technique appropriate for the first frequency band to generate the first modulated data sub-stream. In this example, the first narrow band radio module 412 is an iDEN radio module and can modulate the first data sub-stream using an appropriate modulation technique (e.g., Motorola M16-QAM (Quadrature Amplitude Modulation)) for the data to be transmitted to produce a first modulated data sub-stream. It will be appreciated that iDEN radio module technologies provide a variety of different modulation techniques.

The second narrow band radio module 422 operates at a second data rate (or one of a second set of data rates), and is operable in a second frequency band (or one of a set of second frequency bands) having a second bandwidth. The second narrow band radio module 422 can modulate the second data sub-stream using a second modulation technique appropriate for the second frequency band to generate the second modulated data sub-stream. In this example, the second narrow band radio module 422 is a GSM radio module and can modulate the second data sub-stream using an appropriate GSM modulation technique (e.g., GMSK or 8-PSK) for the data to be transmitted to produce a second modulated data sub-stream. It will be appreciated that GSM technologies provide a variety of different modulation techniques.

In contrast to conventional multi-mode devices, the first narrow band radio module 412 and the second narrow band radio module 422 are configured to operate simultaneously to modulate the first and second data sub-streams, respectively, and simultaneously provide the first and second data sub-streams to the transmitter 403 for simultaneous transmission to a particular destination.

The transmitter 403 can use the first bandwidth and the second bandwidth to simultaneously transmit the first modulated data sub-stream in the first frequency band, and to transmit the second modulated data sub-stream in the second frequency band. The transmitter 403 can transmit the data stream at a combined data rate being substantially equal to the sum of the first data rate and the second data rate. For example, if the first data rate of the iDEN radio module is 96 Kbps, and the second data rate of the GSM radio module is 170 Kbps, then the transmitter 403 can transmit the data stream at a combined data rate of 266 Kbps.

Antenna 506 of the destination node 500 simultaneously receives packet streams comprising the first modulated data sub-stream transmitted from source node 400 over the first frequency band, and the second modulated data sub-stream transmitted from source node 400 over the second frequency band, and provides the first modulated data sub-stream, and the second modulated data sub-stream to the receiver 505. The receiver 505 distributes the first modulated data sub-stream to the first narrow band radio module 512, and the second modulated data sub-stream to the second narrow band radio module 522.

The first narrow band radio module 512 demodulates the first data sub-stream using a first demodulation technique appropriate for the first band to generate a first demodulated data sub-stream. The first demodulation technique can be an iDEN demodulation technique.

The second narrow band radio module 522 simultaneously demodulates the second data sub-stream using a second demodulation technique appropriate for the second band to generate a second demodulated data sub-stream. The second demodulation technique can also be associated with a particular network access protocol (e.g., 802.11, OFDM, CDMA, TDMA, FDMA), and in this example is a GSM demodulation technique, such as a GMSK demodulation technique.

The processor 501 of the destination node 500 then receives the first and second demodulated data sub-streams from the first and second narrow band radio modules 512, 522, respectively. Each packet has unique packet ID or number so that the packet streams can be combined at the processor 501. The processor 501 combines the first and second demodulated data sub-streams by examining packet sequence numbers (or order of arrival numbers), discarding any duplicate packets, and reassembling the packets into the data stream that was originally sent by the source node 400.

In one implementation, the different bands can be spaced apart such that there is a frequency gap between the bands. In some cases, this frequency gap can be larger than the width of each band. In one implementation, a first frequency band (having a first bandwidth) associated with narrow band radio module 412 can be spaced apart from the second frequency band (having a second bandwidth) associated with narrow band radio module 422, such that a frequency gap is present between the first frequency band and the second frequency band. This frequency gap is greater than the first bandwidth and/or the second bandwidth. In some cases, the different frequency bands can have approximately equal bandwidths. For example, in one implementation, a number of 5 MHz bands can be used that are separated by more than 5 MHz. This effectively provides the source node with a 10 MHz transmission bandwidth.

In other implementations, which include additional narrow band radio modules (not shown), the first frequency band can be spaced apart from the second frequency band and from a third frequency band (having a third bandwidth) such that a first frequency gap is present between the first frequency band and the second frequency band, and a second frequency gap is present between the second frequency band and the third frequency band. In one embodiment, the first and second frequency gaps are greater than the first bandwidth and/or the second bandwidth and/or the third bandwidth.

EXAMPLE 2

In another embodiment, the source node can combine a licensed band with an unlicensed band to share capacity between different bands. In one embodiment, these techniques allow the use of spectrum that, for example, is scattered around multiple narrower bands (e.g., Multichannel Multipoint Distribution Service (MMDS) band together with an Industrial Scientific and Medical (ISM) band).

Figure 6:
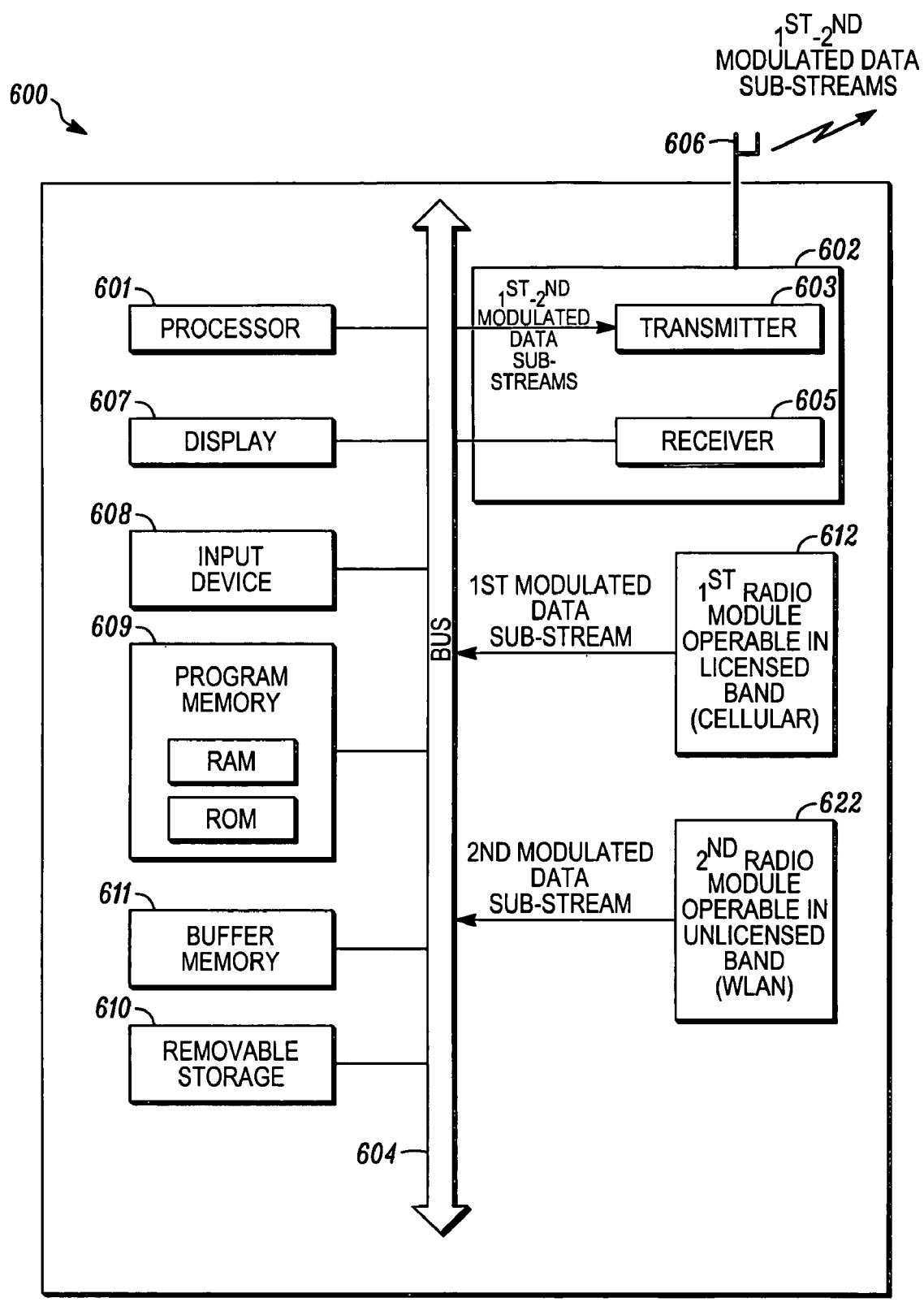
FIG. 6 is a block diagram of an exemplary source node for transmitting information in accordance with another exemplary implementation.
Figure 7:
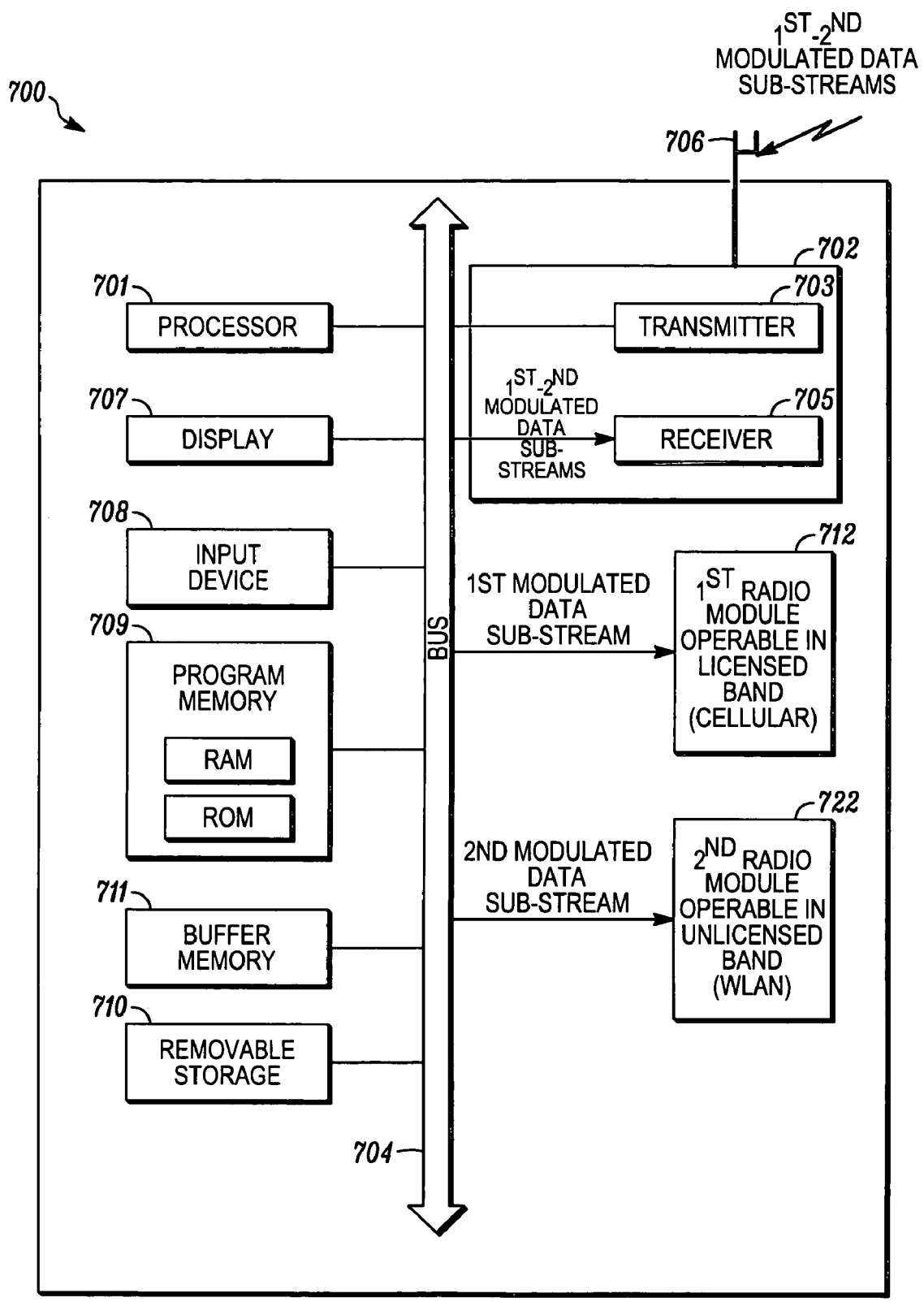
FIG. 7 is a block diagram of an exemplary destination node for receiving the information in accordance with another exemplary implementation.

FIG. 6 is a block diagram of an exemplary source node 600 for transmitting information, and FIG. 7 is a block diagram of an exemplary destination node 700 for receiving the information from the source node 600 in accordance with an exemplary implementation of the invention. Although the reference numbers used in FIG. 6 differ from those used in FIGS. 2 and 4, as shown in FIG. 6, the source node 600 includes many of the same components as the source nodes 200, 400. Moreover, although the reference numbers used in FIG. 7 differ from those used in FIGS. 3 and 5, as shown in FIG. 7, the destination node 700 includes many of the same components as the destination nodes 300 and 500. For sake of brevity those components will not be described here again. As above, it will be appreciated that the source node 600 and destination node 700 can include other additional radio modules which are not shown.

In this implementation, the device 600 includes a first radio module 612 operable in a licensed frequency band and a second radio module 622 operable in an unlicensed frequency band. It will be appreciated that more than one of the first radio modules 612 and that more than one of the second radio modules 622 could be utilized in the node 600. The modules 612, 622 can also be utilized in addition to the radio modules shown in FIGS. 2-5.

The first radio module 612 could be implemented via an iDEN radio module, a GSM radio module, an IS-95 (CDMA) radio module or other equivalent radio modules. In this exemplary implementation, the first frequency band comprises a band of licensed cellular spectrum which can be used for guaranteed bandwidth allocation.

The second radio module 622 could be implemented via an IEEE 802.11 radio module, a WiMax radio module, an IEEE 802.15 radio module or other equivalent radio modules. The second frequency band comprises a band of unlicensed spectrum (e.g., an ISM band in a multi-hopping network).

In excess data situations (e.g., where the source node 600 seeks to transmit more information than can be transmitted using the licensed band of spectrum), the band of unlicensed spectrum can be used for transmitting bursts of data. For example, the node 600 can use 802.11 radio module 622 to increase the bandwidth by sending part of the transmit stream in ISM band. In some implementations, the processor 601 can automatically schedule at least some of the excess data to be transmitted via the unlicensed frequency band.

EXAMPLE 3

Figure 8:
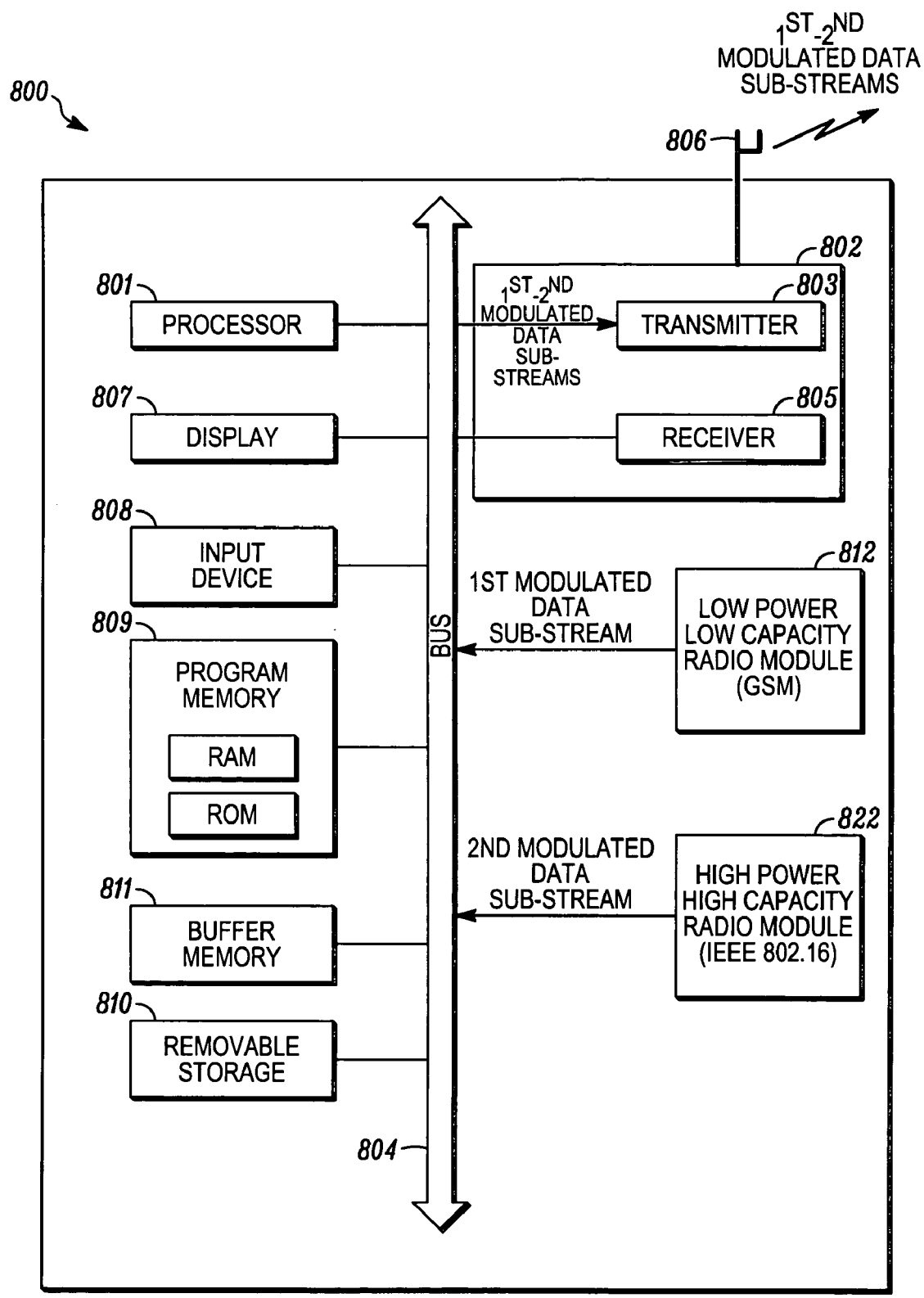
FIG. 8 is a block diagram of an exemplary source node for transmitting information in accordance with yet another exemplary implementation.
Figure 9:
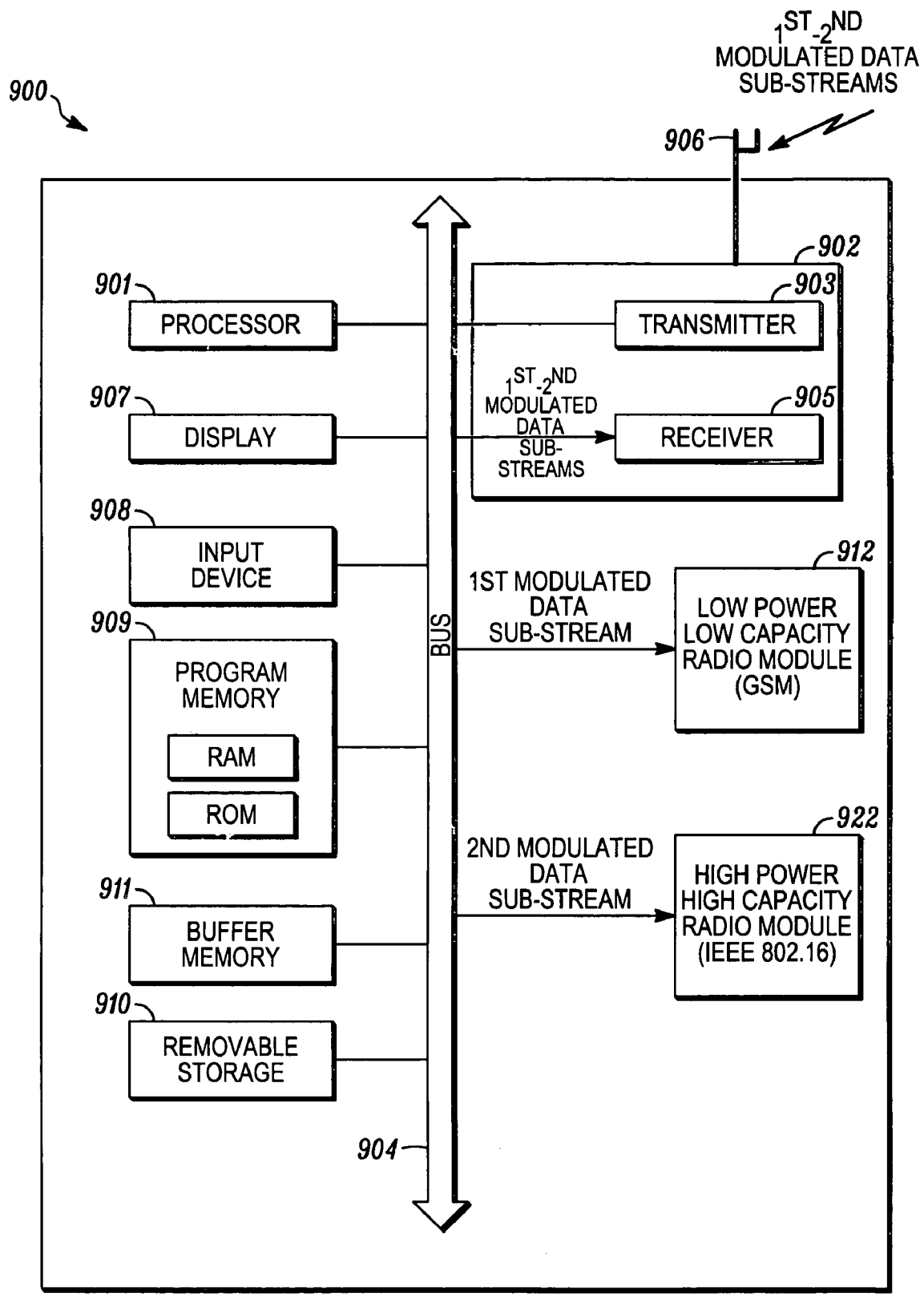
FIG. 9 is a block diagram of an exemplary destination node for receiving the information in accordance with yet another exemplary implementation.

FIG. 8 is a block diagram of an exemplary source node 800 for transmitting information, and FIG. 9 is a block diagram of an exemplary destination node 900 for receiving the information from the source node 800 in accordance with an exemplary implementation of the invention. Although the reference numbers used in FIG. 8 differ from those used in FIGS. 2, 4 and 6, as shown in FIG. 8, the source node 800 includes many of the same components as the source nodes 200, 400, 600. Moreover, although the reference numbers used in FIG. 9 differ from those used in FIGS. 3, 5 and 7, as shown in FIG. 9, the destination node 900 includes many of the same components as the destination nodes 300, 500 and 700. For sake of brevity those components will not be described here again. As above, it will be appreciated that the source node 800 and destination node 900 can include other additional radio modules which are not shown. Thus, while the exemplary nodes 800, 900 in FIGS. 8 and 9 each show two radio modules 812/912, 822/922, it will be appreciated that in other practical implementations nodes could include additional radio modules which are not shown. For example, a node could include other radio modules such as iDEN, WiMax, or IEEE 802.16 radio modules. In addition, in the following example, only the radio modules 812, 822, are used to modulate information that is to be transmitted; however, in other situations, the processor 801 could utilize, for example, additional radio modules (not shown in FIGS. 8 and 9) to modulate information that is to be transmitted.

In this implementation, a low power radio module 812 and a high power radio module 822 are provided. The low power radio module 812 and the high power radio module 822 can be utilized in addition to the radio modules shown in FIGS. 2-7.

The low power radio module 812 could be implemented via an iDEN radio module, a GSM radio module, a CDMA or WCDMA radio module or other equivalent radio modules. The low power radio module 812 is operable in a first band having the first bandwidth. This low power radio module 812 can be active during power saving mode such that communication with the destination node 900 can start by using the lower capacity, low power radio module 812.

The high power radio module 822 could be implemented via a WiMax radio module, an IEEE 802.16 radio module or other equivalent radio modules. The high power radio module 822 is operable in the second frequency band having the second bandwidth. The high power radio module 822 is a higher capacity radio that uses more power than the low power radio module due to a high user data rate together with large link budget. The high power radio module 822 is configured to turn off when its communication capacity is not required for a given time period.

The data stream can initially be transmitted from node 800 using only the low power radio module 812 and its low capacity link. If additional communication capacity is needed, the low power, low capacity radio module 812 can send a wake up signal to the high power radio module 822. After a wake-up time, the high capacity, high power radio module 822 can then be used to transmit the data stream.

Alternatively, the transmission of the data stream can be split among the low power radio module 812 and the high power radio module 822. The processor 801 of the sending node 800 can divide or split a data stream to be transmitted into multiple sub-streams. For instance, in the example of FIG. 8, the processor 801 can divide the data stream into a first data sub-stream having a first size, and a second data sub-stream having a second size. The processor 801 adds a unique packet ID or number to each packet before splitting the data streams so that the packet streams can be combined and efficiently processed at a destination node.

In one embodiment, data can be divided between different radio modules 812, 822 in a ratio of their communication capacities. Thus, when the device 800 wants to transmit, the device 800 can effectively use the combined bandwidths of multiple bands together to create the equivalent of a larger bandwidth communications link for data transmission. For example, in one implementation, the processor 801 can determine the first size of the first data sub-stream and the second size of the second data sub-stream and the third size of the third data sub-stream based on a ratio of the first bandwidth and the second bandwidth. For example, if radio modules 812, 822 support relative bandwidths 1, 10 with respect to each other, then the total bandwidth is 11, and the first size would be $1/11^{th}$ of the total data stream, the second size would be $10/11^{th}$ of the total data stream. In other words, the ratio of the first size to the second size can be the same as the ratio of the first bandwidth and the second bandwidth, and the processor 801 can split the data stream into the first data sub-stream having the first size ($1/11^{th}$ of the total data stream) and the second data sub-stream having the second size ($10/11^{th}$ of the total data stream) based on the ratio of the first bandwidth (1) to the total bandwidth (11), and the second bandwidth (10) to the total bandwidth (11).

In FIG. 8, the low power, low capacity radio module 812 operates at first data rate (or one of a first set of data rates), and is operable in a first frequency band (or one of a set of first frequency bands) having a first bandwidth. The low power, low capacity radio module 812 can modulate the first data sub-stream using a first modulation technique appropriate for the first frequency band to generate the first modulated data sub-stream. In this example, the low power, low capacity radio module 812 is a GSM radio module and can modulate the first data sub-stream using an appropriate modulation technique (e.g., GMSK or 8-PSK) for the data to be transmitted to produce a first modulated data sub-stream. It will be appreciated that GSM technologies provide a variety of different modulation techniques.

The high power, high capacity radio module 822 operates at a second data rate (or one of a second set of data rates), and is operable in a second frequency band (or one of a set of second frequency bands) having a second bandwidth. The high power, high capacity radio module 822 can modulate the second data sub-stream using a second modulation technique appropriate for the second frequency band to generate the second modulated data sub-stream. In this example, the high power, high capacity radio module 822 is an IEEE 802.16 radio module and can modulate the second data sub-stream using an appropriate modulation technique (e.g., OFDM) for the data to be transmitted to produce a second modulated data sub-stream. It will be appreciated that the IEEE 802.16 standard provides a variety of different modulation techniques.

In contrast to conventional multi-mode devices, the low power, low capacity radio module 812, and the high power, high capacity radio module 822 can be configured to operate simultaneously to modulate the first and second data sub-streams, respectively, and simultaneously provide the first and data sub-streams to the transmitter 803 for simultaneous transmission to a particular destination.

The transmitter 803 can use the first bandwidth and the second bandwidth to simultaneously transmit the first modulated data sub-stream in the first frequency band, and to transmit the second modulated data sub-stream in the second frequency band. The transmitter 803 can transmit the data stream at a combined data rate being substantially equal to the sum of the first data rate and the third data rate. For example, if the first data rate of the low power, low capacity radio module is 170 Kbps, and the second data rate of the high power, high capacity radio module is 25 Mbps, then the transmitter 803 can transmit the data stream at a combined data rate of 25.175 Mbps.

Antenna 906 simultaneously receives packet streams comprising the first modulated data sub-stream transmitted from source node 800 over the first frequency band, and the second modulated data sub-stream transmitted from source node 800 over the second frequency band, and provides the first and second modulated data sub-streams to the receiver 905. The receiver 905 distributes the first modulated data sub-stream to the low power, low capacity radio module 912, and the second modulated data sub-stream to the high power, high capacity radio module 922.

The low power, low capacity radio module 912 demodulates the first data sub-stream using a first demodulation technique appropriate for the first band to generate a first demodulated data sub-stream. The first demodulation technique can be associated with a particular network access protocol (e.g., GSM), and in this example is a GMSK demodulation technique.

The high power, high capacity radio module 922 simultaneously demodulates the second data sub-stream using a second demodulation technique appropriate for the second band to generate a second demodulated data sub-stream. The second demodulation technique can also be associated with a particular network access protocol (e.g., IEEE 802.16), and in this example is an OFDM demodulation technique.

The processor 901 then receives the first and second demodulated data sub-streams from the first and second radio modules 912, 922, respectively. Each packet has a unique packet ID or number so that the packet streams can be combined at the processor 901. The processor 901 combines the first and second demodulated data sub-streams by examining packet sequence numbers (or order of arrival numbers), discarding any duplicate packets, and reassembling the packets into the data stream that was originally sent by the source node 800.

This technique can reduce power consumption (e.g., can save battery resources) and can also reduce the delay that is associated with periodically powering up a high capacity radio module 822.

Thus, according to these techniques, a source splits a pack stream into multiple packet streams, modulates the packet streams using appropriate modulation techniques associated with multiple radios, and transmits the packet streams over multiple bands to a destination. The destination receives these packet streams over the multiple bands, demodulates the packet streams using appropriate demodulation techniques associated with multiple radios, and combines the demodulated packet streams to create the single original packet stream sent by the source. These techniques can be used to implement a multi-band multi-hopping system in which nodes can simultaneously aggregate the capacity of multiple bandwidths to create larger bandwidth communications link.

In the foregoing specification, specific embodiments of the present invention have been described. However, one of ordinary skill in the art appreciates that various modifications and changes can be made without departing from the scope of the present invention as set forth in the claims below. For example, while the source nodes and destination nodes described above are shown as being mobile units, the source nodes and destination nodes can be implemented as fixed access points (APs) or base stations (BTSs).

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A device comprising:
    a processor configured to divide a data stream into a first data sub-stream and a second data sub-stream;
    a first radio module having a first data rate, the first radio module being operable in a first frequency band having a first bandwidth and being configured to modulate the first data sub-stream using a first modulation technique to generate a first modulated data sub-stream; and
    a second radio module having a second data rate the second radio module being operable in a second frequency band having a second bandwidth and being configured to modulate the second data sub-stream using a second modulation technique to generate a second modulated data sub-stream,
    wherein the first data sub-stream has a first size and the second data sub-stream has a second size, wherein a ratio of the first size to the second size is based on a ratio of the first bandwidth and the second bandwidth, wherein the processor is configured to split the data stream into the first data sub-stream having the first size and the second data sub-stream having the second size based on the ratio of the first bandwidth and the second bandwidth.

2. A device according to claim 1, wherein the first radio module and the second radio module are configured to operate simultaneously to modulate the first data sub-stream and the second data sub-stream, respectively.

3. A device according to claim 1, wherein the processor is configured to divide the data stream into the first data sub-stream having the first size, the second data sub-stream having the second size and a third data sub-stream having a third size, and further comprising:
- a third radio module having a third data rate, the third radio module being operable in a third frequency band having a third bandwidth and being configured to modulate the third data sub-stream using a third modulation technique to generate a third modulated data sub-stream, and
- wherein the processor is configured to split the data stream into the first data sub-stream having the first size, the second data sub-stream having the second size and the third data-substream having the third size based on a ratio of the first bandwidth, the second bandwidth, and the third bandwidth.

4. A device according to claim 3, further comprising:
- a transmitter configured use the first bandwidth, the second bandwidth and the third bandwidth to simultaneously transmit the first modulated data sub-stream in the first frequency band, transmit the second modulated data sub-stream in the second frequency band, and transmit the third modulated data sub-stream in the third frequency band, wherein the transmitter is configured to transmit the data stream at fourth data rate being substantially equal to the sum of the first data rate, the second data rate and the third data rate.

5. A device, comprising:
- a processor configured to divide a data stream into a first data sub-stream and a second data sub-stream;
- a first radio module having a first data rate, the first radio module being operable in a first frequency band having a first bandwidth and being configured to modulate the first data sub-stream using a first modulation technique to generate a first modulated data sub-stream; and
- a second radio module having a second data rate, the second radio module being operable in a second frequency band having a second bandwidth and being configured to modulate the second data sub-stream using a second modulation technique to generate a second modulated data sub-stream,
- wherein the first radio module operable in the first frequency band having the first bandwidth, comprises:
- a low power radio module operable in a first narrow band having the first bandwidth, wherein the low power radio module is active during power saving mode,
- wherein the second radio module comprises a high power radio module configured to turn off when its capacity is not required for a given time period,
- wherein the low power radio module sends a wake up signal to the high power radio module when transmission capacity of the low power radio module is inadequate.

6. A device, comprising:
- a receiver configured to receive at least a first data sub-stream over a first frequency band and a second data sub-stream over a second frequency band;
- a first radio module being configured to demodulate the first data sub-stream using a first demodulation technique to generate a first demodulated data sub-stream;
- a second radio module being configured to demodulate the second data sub-stream using a second demodulation technique to generate a second demodulated data sub-stream; and
- a processor configured to combine the first demodulated data sub-stream and the second demodulated data sub-stream to generate a data stream;
- wherein the first data sub-stream has a first size and the second data sub-stream has a second size, wherein a ratio of the first size to the second size is based on a ratio of the first bandwidth and the second bandwidth.

7. A device according to claim 6, wherein the first radio module and the second radio module are configured to simultaneously demodulate the first data sub-stream and the second data sub-stream, respectively.

8. A device according to claim 6, wherein the receiver is further configured to receive a third data sub-stream, and further comprising:
- a third radio module being configured to demodulate the third data sub-stream using a third demodulation technique, and wherein the processor is configured to combine the first demodulated data sub-stream received from the first radio module, the second demodulated data sub-stream received from the second radio module and the third demodulated data sub-stream received from the third radio module to generate the data stream.

9. A device according to claim 8, wherein the processor is configured to generate the data stream by examining packet sequence numbers at each radio module, discarding any duplicate packets, and reassembling the packets into the data stream.

10. A system for communicating a data stream, comprising:
- a first node configured to divide the data stream into a first data sub-stream and a second data sub-stream, the first node comprising a first radio module having a first data rate, the first radio module being operable in a first frequency band having a first bandwidth and being configured to modulate the first data sub-stream using a first modulation technique to generate a first modulated data sub-stream, and a second radio module having a second data rate, the second radio module being operable in a second frequency band having a second bandwidth and being configured to modulate the second data sub-stream using a second modulation technique to generate a second modulated data sub-stream,
- wherein the first data sub-stream has a first size and the second data sub-stream has a second size, wherein a ratio of the first size to the second size is based on a ratio of the first bandwidth and the second bandwidth,
- wherein the processor is configured to split the data stream into the first data sub-stream having the first size and the second data sub-stream having the second size based on the ratio of the first bandwidth and the second bandwidth; and
- a second node configured to receive at least the first data sub-stream over the first frequency band and the second data sub-stream over the second frequency band, the second node comprising a first radio module being configured to demodulate the first data sub-stream using a first demodulation technique to generate a first demodulated data sub-stream, and a second radio module being configured to demodulate the second data sub-stream using a second demodulation technique to generate a second demodulated data sub-stream, wherein the second node is configured to combine the first demodulated data sub-stream and the second demodulated data sub-stream to generate a data stream.

11. A method for communicating a data stream, comprising:

dividing the data stream into a first data sub-stream and a second data sub-stream, wherein the first data sub-stream has a first size and the second data sub-stream has a second size, wherein a ratio of the first size to the second size is based on a ratio of the first bandwidth and the second bandwidth, wherein the data stream is divided into the first data sub-stream having the first size and the second data sub-stream having the second size based on the ratio of the first bandwidth and the second bandwidth;

modulating the first data sub-stream using a first modulation technique to generate a first modulated data sub-stream; and modulating the second data sub-stream using a second modulation technique to generate a second modulated data sub-stream.

12. A method according to claim 11, further comprising:

receiving the first data sub-stream over a first frequency band;

receiving the second data sub-stream over a second frequency band;

demodulating the first data sub-stream using a first demodulation technique to generate a first demodulated data sub-stream;

demodulating the second data sub-stream using a second demodulation technique to generate a second demodulated data sub-stream; and combining the first demodulated data sub-stream and the second demodulated data sub-stream to generate a data stream.

* * * * *

UNITED STATES PATENT AND TRADEMARK OFFICE
CERTIFICATE OF CORRECTION

PATENT NO.         : 8,014,415 B2
APPLICATION NO.    : 11/324097
DATED              : September 6, 2011
INVENTOR(S)        : Alapuranen It is certified that error appears in the above-identified patent and that said Letters Patent is hereby corrected as shown below:

In Column 18, Line 36, delete "base stations (BTSs)." and insert -- base transceiver stations (BTSs). --, therefor.

Signed and Sealed this
Eighteenth Day of December, 2012

David J. Kappos
*Director of the United States Patent and Trademark Office*